(12) United States Patent (10) Patent No.: US 9,100,607 B2
Fukuhara (45) Date of Patent: Aug. 4, 2015

(54) IMAGE DISPLAY APPARATUS, IMAGE DISPLAY SYSTEM, AND IMAGE DISPLAY CONTROL PROGRAM

(75) Inventor: Takahiro Fukuhara, Yokosuka (JP)

(73) Assignee: KONICA MINOLTA BUSINESS TECHNOLOGIES, INC. (JP)

( * ) Notice: Subject to any disclaimer, the term of this patent is extended or adjusted under 35 U.S.C. 154(b) by 290 days.

(21) Appl. No.: 13/452,732

(22) Filed: Apr. 20, 2012

(65) Prior Publication Data

US 2012/0274952 A1 Nov. 1, 2012

(30) Foreign Application Priority Data

Apr. 26, 2011 (JP) ................................. 2011-097870

(51) Int. Cl.
  *H04N 1/393* (2006.01)
  *H04N 1/387* (2006.01)
(52) U.S. Cl.
  CPC ............... *H04N 1/387* (2013.01); *H04N 1/393* (2013.01); *G09G 2340/02* (2013.01); *G09G 2340/045* (2013.01)
(58) Field of Classification Search
  CPC .................................................. G06K 15/007
  See application file for complete search history.

(56) References Cited

U.S. PATENT DOCUMENTS 5,195,175 A * 3/1993 Kanno et al. ................... 358/1.6
2009/0122351 A1 * 5/2009 Tsuchitoi ...................... 358/3.28

FOREIGN PATENT DOCUMENTS

JP 2006-252191 9/2006
JP 2007-150556 6/2007

* cited by examiner

*Primary Examiner* — Saeid Ebrahimi Dehkord
*Assistant Examiner* — Lennin Rodriguezgonzale
(74) *Attorney, Agent, or Firm* — Squire Patton Boggs (US) LLP

(57) ABSTRACT

Disclosed is an image display apparatus that sets a thinning rate, determined according to a designated display magnification ratio, with reference to plural display magnification ratio ranges, and a predetermined thinning rate determined in association with each display magnification ratio range, stores page image data, obtained from an apparatus storing information about the job, into a storage section by thinning page image data, pasts the thinned page image into a frame having a size according to the designated display magnification ratio, and displays the image pasted into the frame. When a display magnification ratio is changed within an identical display magnification ratio range, the image display apparatus pastes, by utilizing page image data according to a thinning rate before the change, the page image after magnifying it to fit into a frame having a size according to a display magnification ratio after the change.

6 Claims, 10 Drawing Sheets

FIG. 1a

PRINTING SYSTEM

10: COMPUTER APPARATUS
40: COMMUNICATION NETWORK
20: PRINT CONTROL APPARATUS (CONTROLLER)
30: OUTPUT APPARATUS

FIG. 1b

PRINTING SYSTEM

10: COMPUTER APPARATUS
40: COMMUNICATION NETWORK
30: OUTPUT APPARATUS (INCLUDING PRINT CONTROL APPARATUS 20)

| DISPLAY MAGNIFICATION RATIO (%) | 5 ······ 10 | 11 ······ 20 | 21 ······ 30 | 31 ······ 40 | 41 ······ 50 |
|---|---|---|---|---|---|
| IMAGE | | | | | |
| THINNING RATE | 20% | 15% | 10% | 8% | 6% |
| DISPLAY MAGNIFICATION RATIO (%) | 51 ······ 60 | 61 ······ 70 | 71 ······ 80 | 81 ······ 90 | 91 ······ 100 |
| IMAGE | | | | | |
| THINNING RATE | 4% | 3% | 2% | 1% | 0% |

FIG. 7

| DISPLAY MAGNIFICATION RATIO (%) | 5 ······ 10 | 11 ······ 20 | 21 ······ 30 | 31 ······ 40 | 41 ······ 50 |
|---|---|---|---|---|---|
| PAPER SHEET FRAME | | | | | |
| IMAGE | | | | | |
| DISPLAY MAGNIFICATION RATIO (%) | 51 ······ 60 | 61 ······ 70 | 71 ······ 80 | 81 ······ 90 | 91 ······ 100 |
| PAPER SHEET FRAME | | | | | |
| IMAGE | | | | | |

IMAGE DISPLAY APPARATUS, IMAGE DISPLAY SYSTEM, AND IMAGE DISPLAY CONTROL PROGRAM

This application is based on Japanese Patent Application No. 2011-097870 filed on Apr. 26, 2011, in Japanese Patent Office, the entire content of which is hereby incorporated by reference.

TECHNICAL FIELD

The present invention relates to an image display apparatus, an image display system, and an image display control program, specifically relating to an image display apparatus and an image display system in each of which a page image, which has been thinned from an original image, is displayed in a preview representation, and an image display control program which controls the display of a page image.

BACKGROUND OF THE INVENTION

Various kinds of printing apparatuses, such as a printer, a digital multi-function peripheral, or the like (hereinafter, referred to as an image forming apparatus, as a general term of them), has become popular in the market, and in companies or the like, an image forming apparatus is connected to a network so that a printing operation can be instructed from a client computer apparatus, or the like. Also, it is possible to instruct a printing operation from a client computer apparatus in such a way that a print control apparatus (controller), which controls an image forming apparatus, is connected to a network, and a print job is stored in the print control apparatus. This configuration enables the stored print job to be utilized for printing. In this case, confirmation of printing content is carried out by displaying on the client computer apparatus a page image for confirming a print image of each page of the print job.

With respect to display of a page image like this, an image processing apparatus has been disclosed by Japanese Patent Application Publication No. 2007-150556, as an example, in which the image processing apparatus includes: a) an input means for inputting a image data composed of a plurality of pages; b) a compressing means for compressing an image data having been input from the input means; c) a storage means for storing an image data; d) a reduction means for reducing an image data; e) a storage control means for storing a predetermined page of the plurality of pages, having been input, into the storage means in a non-compression state, and storing a page other than the predetermined page into the storage means in a compression state, compressed via the compression means; and f) a display means for reading out an image data, having been stored in the storage means in the non-compression state, and displaying the image data by reducing it via the reduction means.

Also, an image processing apparatus has been disclosed by Japanese Patent Application Publication No. 2006-252191, in which the image processing apparatus includes: a) an image forming means for performing image formation on a paper sheet based on an image data subject to image formation; b) a print job storage means for storing each print job information which is supplementary information on each print job having been received from each of other apparatuses; c) a print order storage means for storing information on the order of printing, which is information indicating the order of processing of each print job having been stored in the print job storage means; d) a print job output time calculation means for calculating an output time, which is the time of completion of a printing processing, via the image forming means, for image data corresponding to each print job, based on: information of the number of prints, the information included in each print job information having been stored in the print job storage means, and indicating the number of corresponding image data; and the print order information; e) a thumbnail display means for displaying a list of each thumbnail image which is a reduced image based on each image data corresponding to each print job information having been stored in the print job storage means; and f) an additional information display means for displaying: each output time calculated via the print job output time calculation means in response to each print job corresponding to each thumbnail having been displayed via the thumbnail display means; and each of the information of the number of prints pertaining to each image data corresponding to each print job, in accordance with a predetermined operation for additional information display instruction.

In an application for displaying a page image, it is possible to adjust the number of page images to be displayed on one screen by adjusting the display magnification ratio of the page images to be displayed in a preview representation on the screen. However, in a case in which the display magnification ratio of the page images is made to be small, the number of pages displayed on one screen increases, and data amount equivalent to the page images of the number of pages needs to be handled. Therefore, it requires time to display these page images, which results in a decrease in display speed. For this problem, in a case in which display magnification ratio is made to be small, because physical appearance of the page image on the screen is not changed even if the data size of the image data is reduced, processing is carried out so as to reduce the size of image data (thinning processing) in accordance with the display magnification ratio. It is to be noted that the thinning processing is the general term for processing for reducing the size of bitmap data.

However, because it is possible to minutely adjust display magnification of page images in recent applications, in the case of a method in which the thinning rate is minutely set in accordance with the display magnification ratio, thinning processing is carried out with respect to the page image of the number of pages which can be displayed each time even when the display magnification ratio is adjusted delicately, thus, resulted in a decrease in display speed of the page images after all.

SUMMARY OF THE INVENTION

The present invention has been achieved in consideration of the above problems, and it is one of the main objects to provide an image display apparatus, an image display system, and an image display control program, specifically, relating to an image display apparatus, an image display system, and an image display control program, each of which is capable of redisplaying a page image promptly in a case in which a display magnification ratio is changed, while maintaining the quality of display.

An image forming apparatus reflecting one aspect of the present invention includes, but is not limited to: a) a storage section for storing a plurality of magnification ratio ranges, and a predetermined thinning rate which has been determined in association with each of the magnification ratio range; b) a job information downloading section for obtaining an image data pertinent to the image from an apparatus that stores an information about the job; c) a thinning rate setting section for setting a thinning rate, having been determined in association with a designated display magnification ratio, with reference to the storage section; d) a thinning processing section for carrying out a thinning processing with respect to the image data in accordance with the thinning rate having been set, and storing the image data, which has been subjected to the thinning processing, in the storage section; e) an image pasting section for pasting an image, which is based on the image data which has been subjected to the thinning processing in accordance with the thinning rate having been determined in association with the designated display magnification ratio, into a frame having a size in accordance with the designated display magnification ratio; and f) an image display section for displaying an image which has been pasted into the frame, wherein, in a case in which a display magnification ratio is changed within an identical display magnification ratio range, the image pasting section is configured to paste an image, which is based on the image data, by using an image data that has been subjected to the thinning processing in accordance with a thinning rate before the change, the thinning rate which has been stored in the storage section, by magnifying the image, which is based on the image data, so as to fit into a frame having a size in accordance with a display magnification ratio after the change.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

As described in the "BACKGROUND OF THE INVENTION", in a case in which the page image of the print image of each page of a print job, having been stored in a print control apparatus, is to be displayed on a client's computer apparatus, the number of pages to be displayed increases as the display magnification ratio of page image decreases, which requires time for image processing, and therefore, which resulted in a decrease in display speed of page images.

Here, with respect to the page image, because it is only necessary to know what image will be printed on a sheet of paper, in case in which the display magnification ratio of a page image is small, it is not necessary to display the page image in high resolution. Conversely, in a case in which the display magnification ratio of a page image is large, because the number of pages to be displayed decreases, no influence is made on processing speed even if data amount is increased in order to maintain the definition of a page image of one page. Therefore, conventionally, thinning processing is carried out in which a page image is thinned at a thinning rate which is set minutely in accordance with the display magnification ratio. In such a method, however, even in a case in which the display magnification ratio is changed slightly, the thinning processing is carried out at a thinning rate in accordance with the display magnification ratio after the change, and therefore, the speed to display the page image is still slow down.

Therefore, according to a preferred embodiment of the present invention, a range is provided to display magnification ratios of page images, and a thinning rate is associated with each of the ranges. Then, in a case in which a display magnification ratio within the same rage is changed, a page image corresponding to the display magnification ratio after the change is generated by utilizing the page image, which has been generated with respect to the display magnification ratio before the change, instead of generating a page image corresponding to the page image after the change by thinning the original image. Also, in a case in which the page image, which has been generated with respect to the display magnification before the change, is used as it is, the display size of the page image does not change even if the display magnification ratio is changed, and therefore, it is controlled in such a way that the page image is displayed in the entirety of the outline shape of a paper sheet (paper sheet frame) in accordance with the display magnification ratio.

In such a way, by redisplaying the page image at a new display magnification ratio by utilizing a page image which has been subjected to the thinning process, instead of generating a page image one at a time from original image of which the size is larger, the data amount to be handled can be reduced, and therefore, a page image can be redisplayed promptly while maintaining the display quality. Also, because the size is adjusted so that the page image is displayed within the entirety of the paper sheet frame in accordance with the display magnification ratio after the change, instead of displaying the page image, having been generated with respect to the display magnification ratio before the change, as it is, an output result (print result in the case of printing of the image) can be verified accurately.

It is to be noted that the present invention can also be applied in cases in which images primarily intended to be browsed (for example, images that have been published on the Internet) is displayed in a preview representation because it requires time to redisplay a page image if a thinning processing is carried out each time when display magnification ratio is changed. In the case of print image, however, the configuration (paper sheet size of each page, itemization and arrangement of an object, character size, and the like) is often similar to each other, and therefore, there are many works such as works to confirm the content of each page in detail by adjusting the display magnification ratio, works to overlook pages of the entirety of the job, and the like. Therefore, a failure of printing an unintended image tends to occur if these works are neglected. Thus, print image is considered as a specifically preferred subject of the present invention with which redisplay of a page image can be executed promptly.

Also, although the quality of a page image becomes uneven if an identical thinning processing is carried out with respect to all images in a case in which the data size of original images differ substantially, a page image, obtained by reducing the size of the print image of each page within an identical print job, is nearly constant data size, and the quality of the page image becomes uniform even if an identical thinning processing is carried out with respect to all images, and thus, print image is considered as a specifically preferred subject of the present invention.

In preferred embodiments to be described below, the cases, in which the present invention is applied to a printing system which deals with a print image and a client computer apparatus in which printing content is confirmed by displaying a page image of the print image, will be described.

[Preferred Embodiment]

Figure 1A:
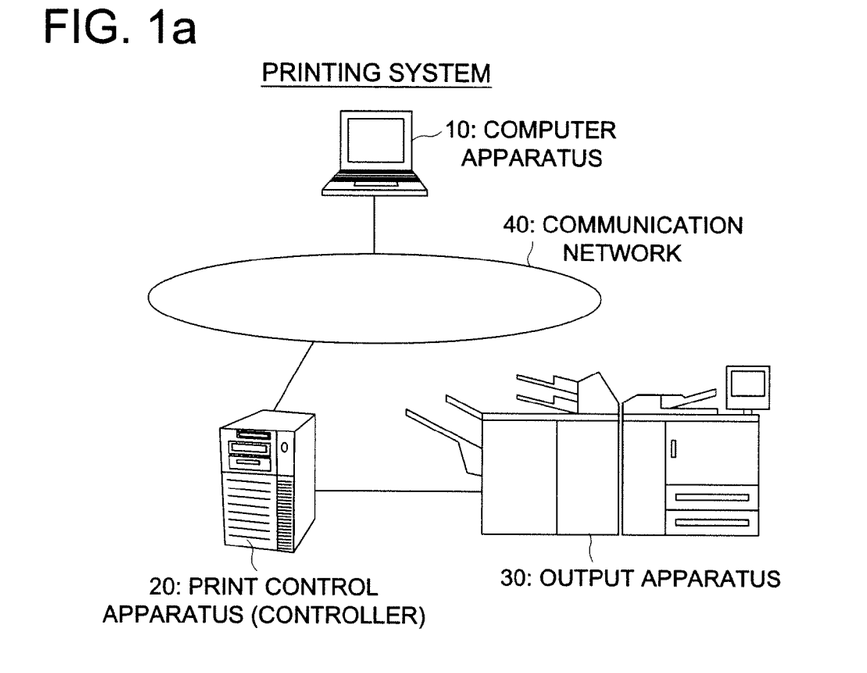
FIGS. 1a and 1b are each a conceptual diagram illustrating a printing system according to a preferred embodiment of the present invention.
Figure 1B:
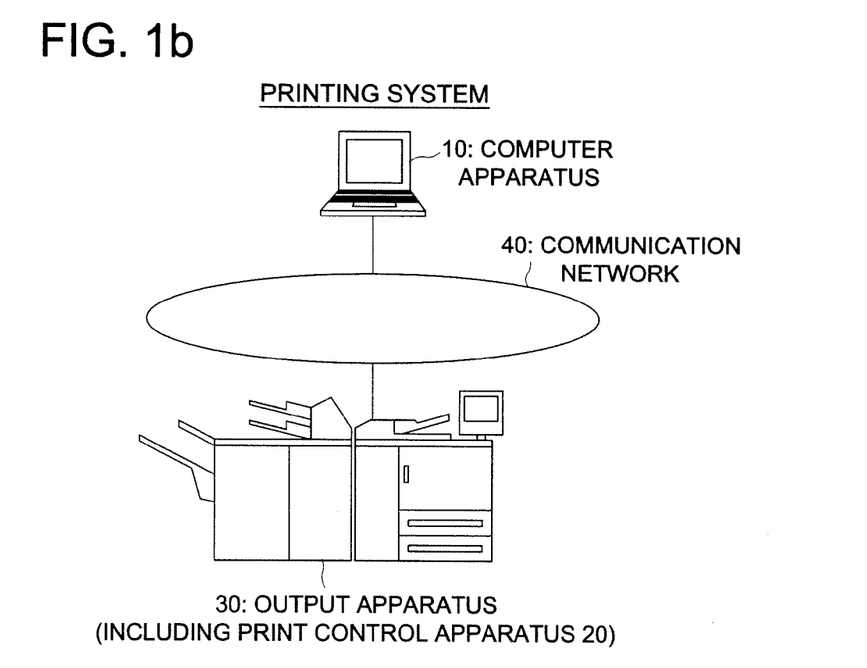
Figure 2:
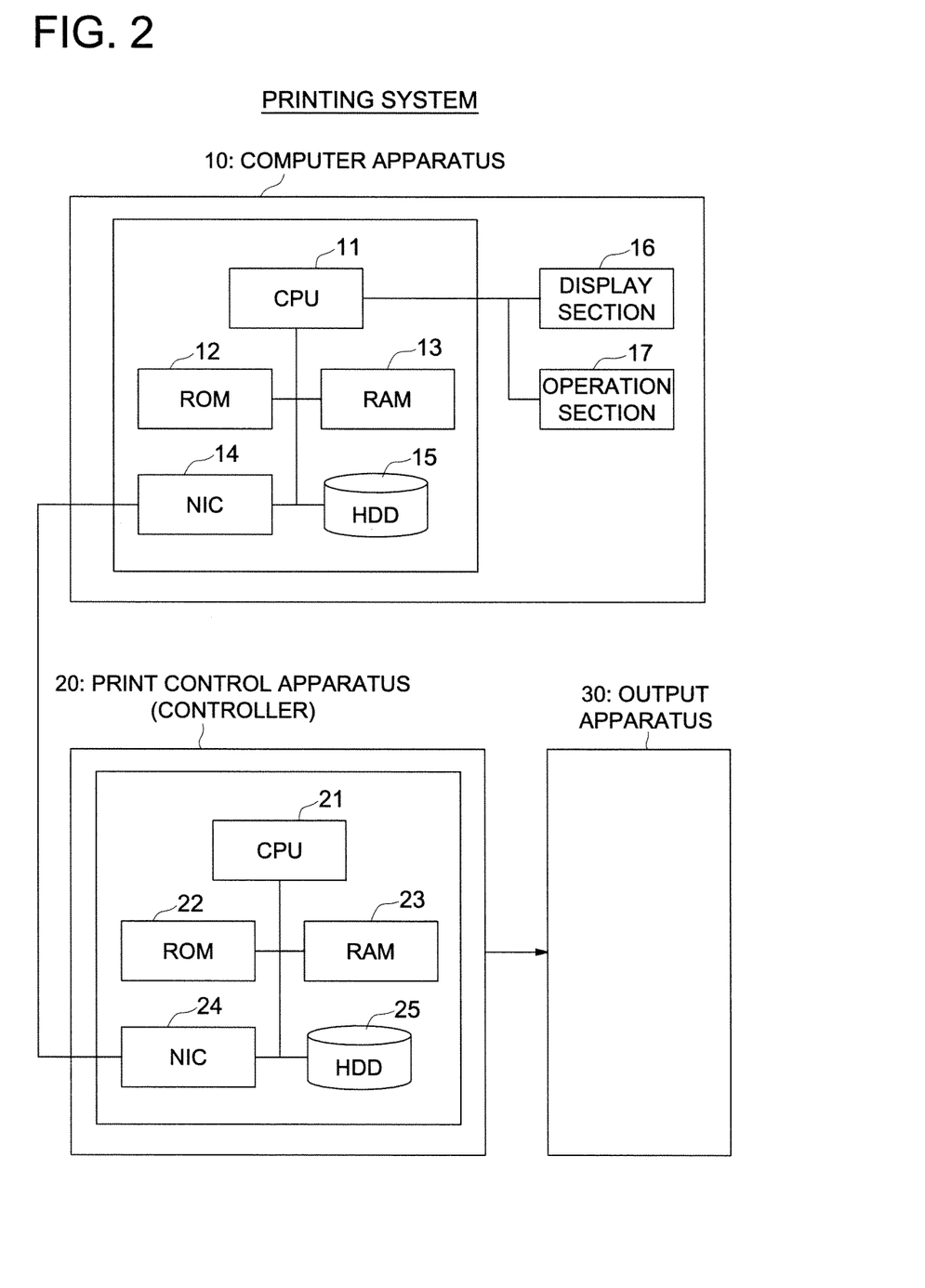
FIG. 2 is a block diagram illustrating a configuration of a printing system according to a preferred embodiment of the present invention.
Figure 3:
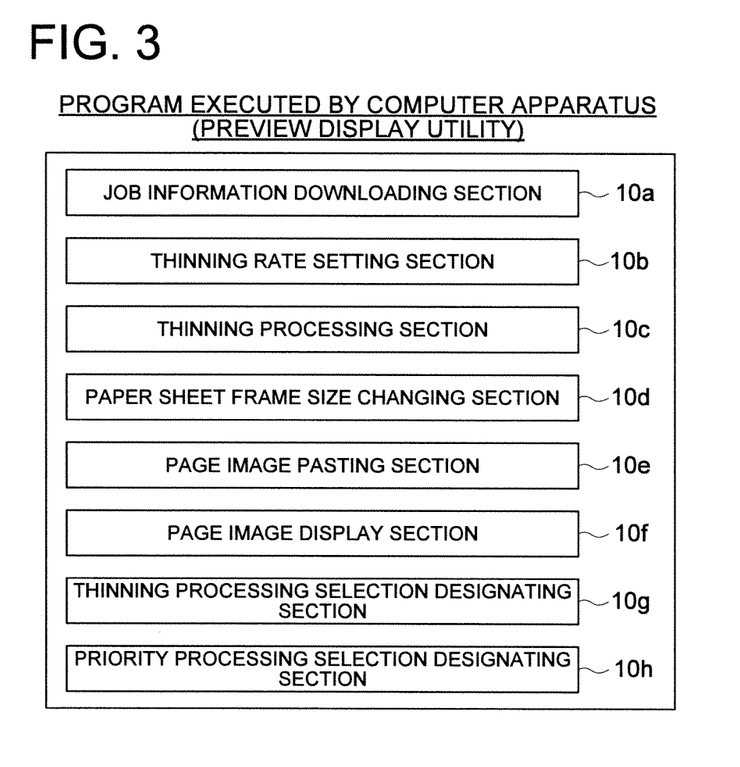
FIG. 3 is a block diagram illustrating a configuration of a program (preview display utility) which is executed by a computer apparatus according to a preferred embodiment of the present invention.
Figure 4:
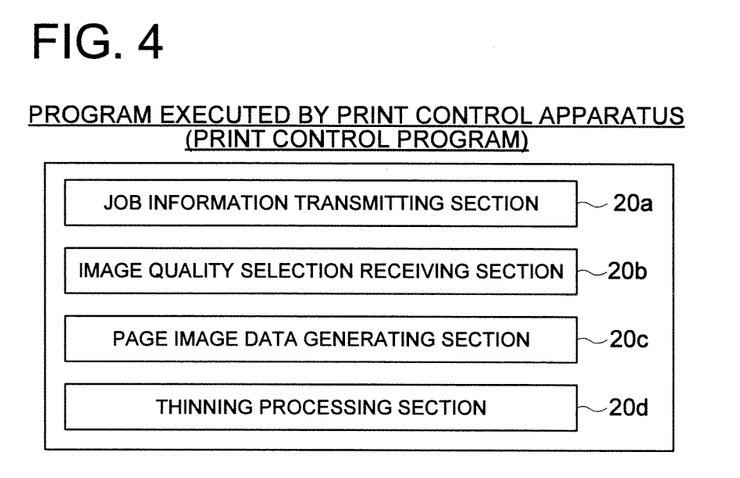
FIG. 4 is a block diagram illustrating a configuration of a program (print control program) which is executed by a print control apparatus according to a preferred embodiment of the present invention.
Figure 5A:
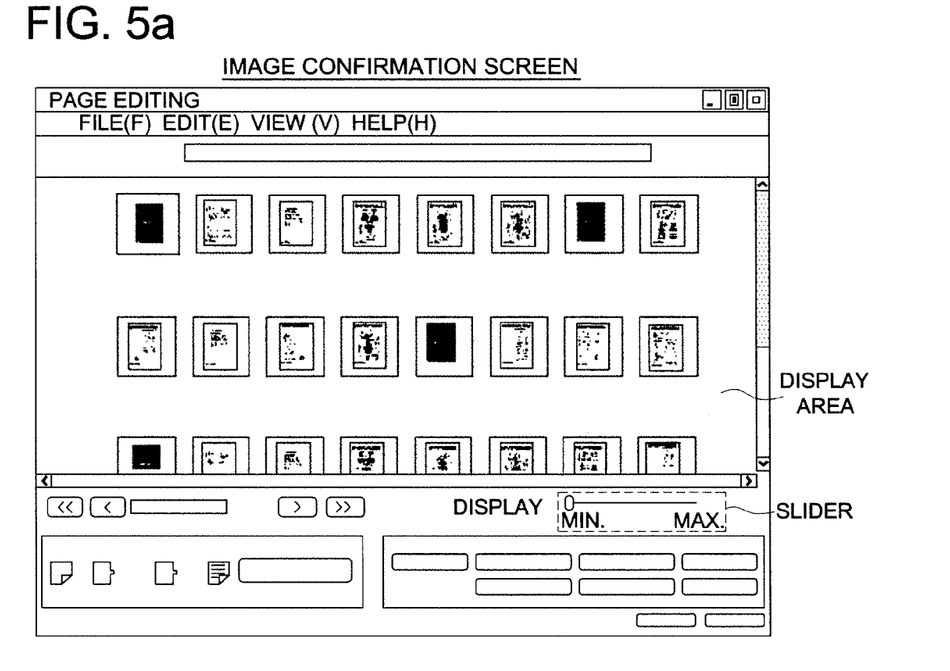
FIGS. 5a and 5b are each a block diagram illustrating a configuration of a screen (image confirmation screen) which is displayed on a display section of a computer apparatus according to a preferred embodiment of the present invention.
Figure 5B:
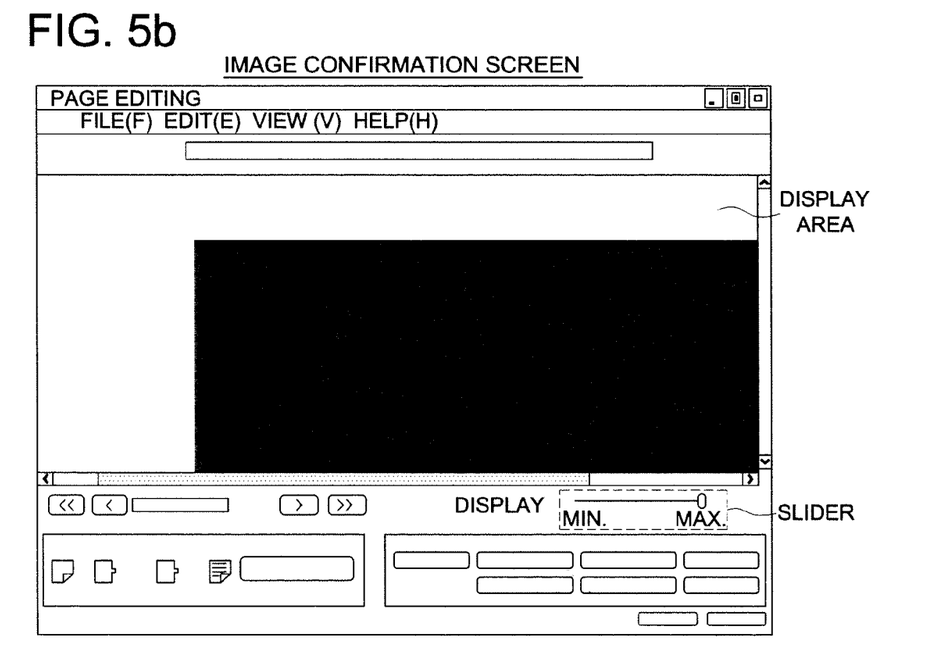
Figure 6:
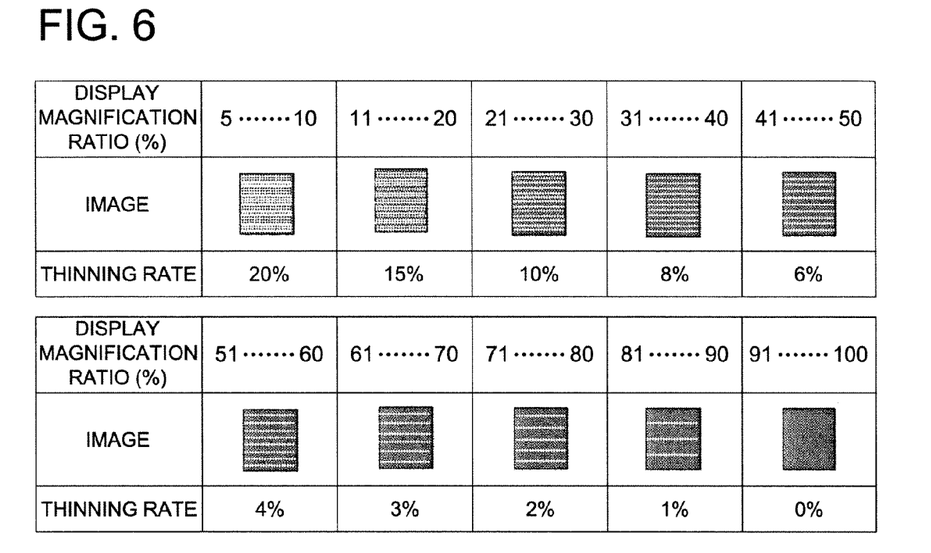
FIG. 6 is a diagram illustrating a relationship between a display magnification ratio and a thinning rate.
Figure 7:
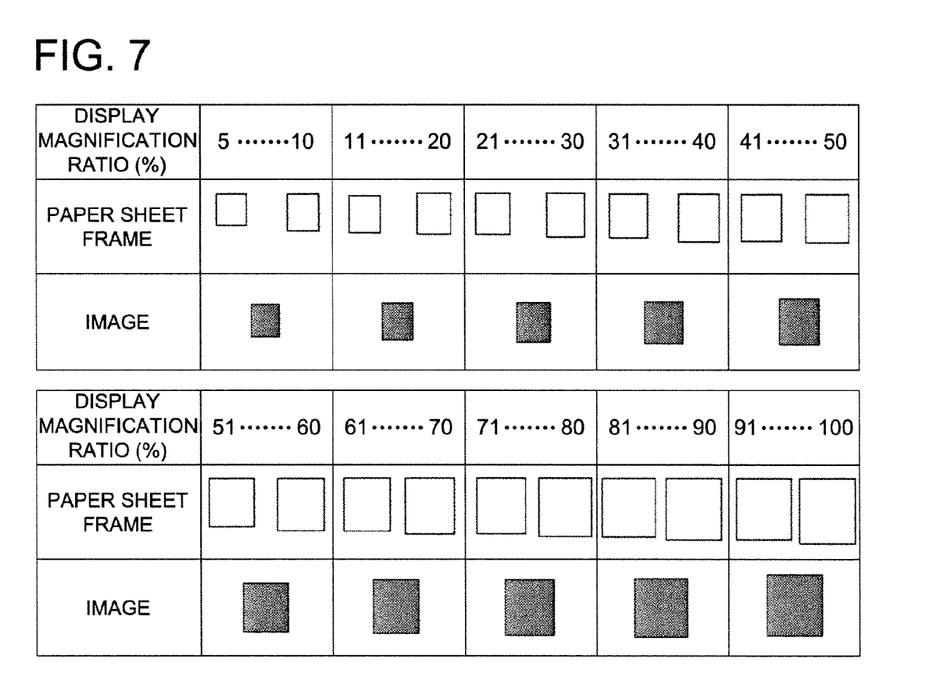
FIG. 7 is a diagram illustrating a relationship between a paper sheet frame in each display magnification ratio and a display image (image to be displayed).
Figure 8:
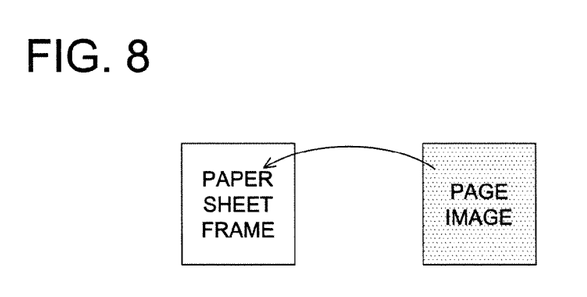
FIG. 8 is an explanatory diagram illustrating processing to draw a page image in a paper sheet frame.
Figure 9:
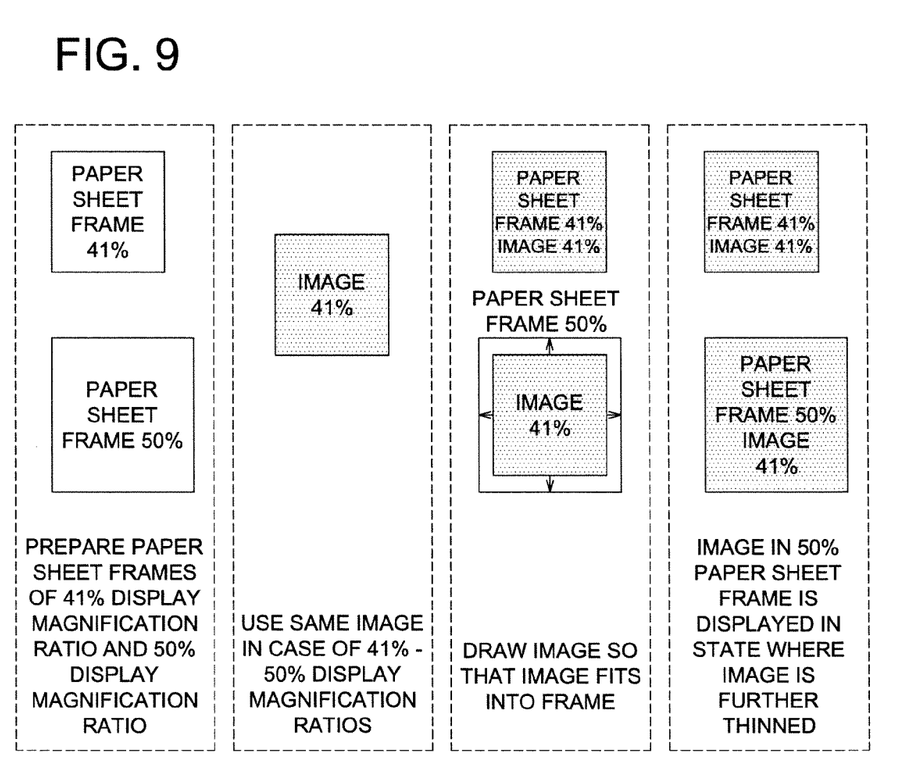
FIG. 9 is an explanatory diagram illustrating processing to paste a page image in the entirety of a paper sheet frame.
Figure 10:
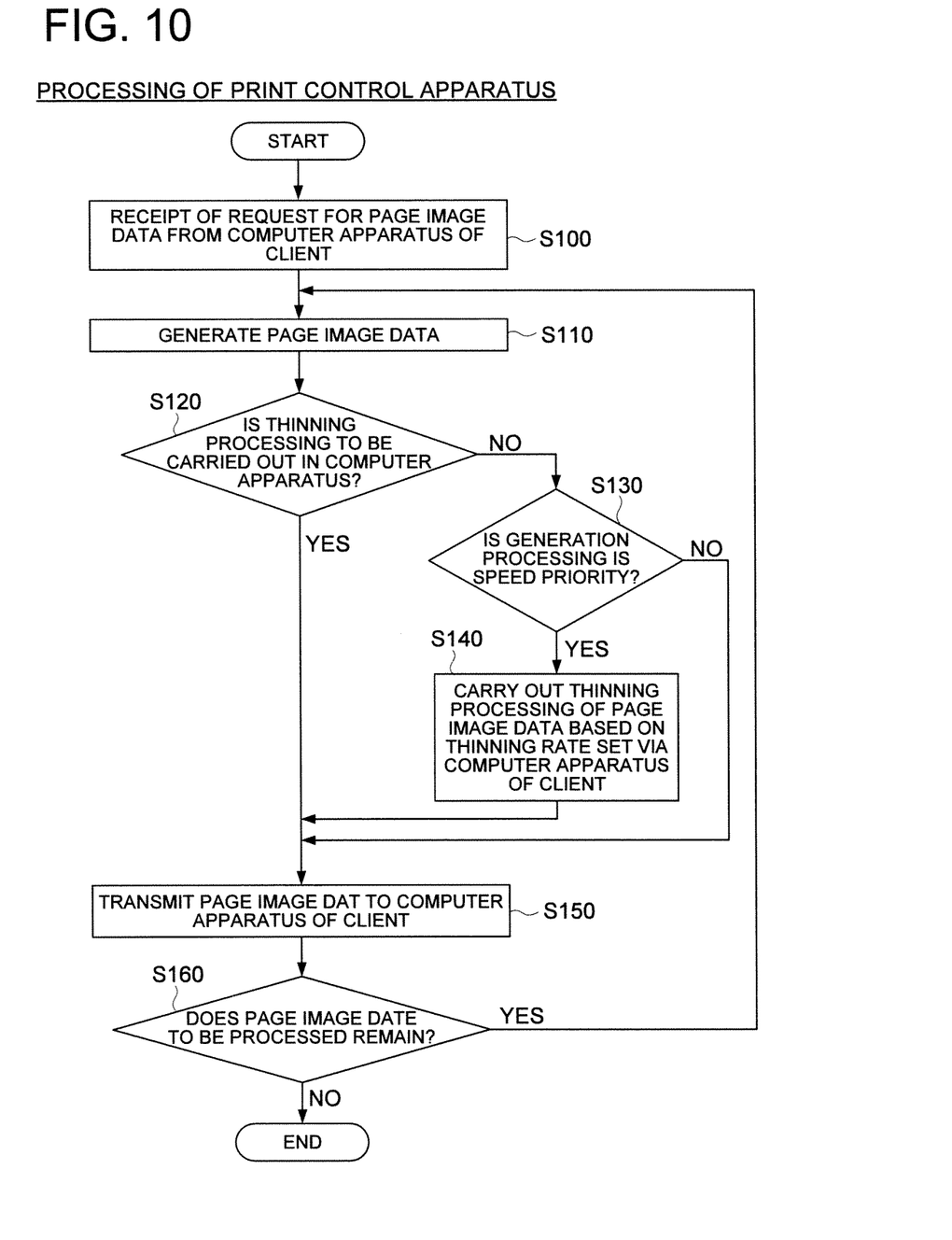
FIG. 10 is a flowchart illustrating processing of a print control apparatus according to a preferred embodiment of the present invention.
Figure 11:
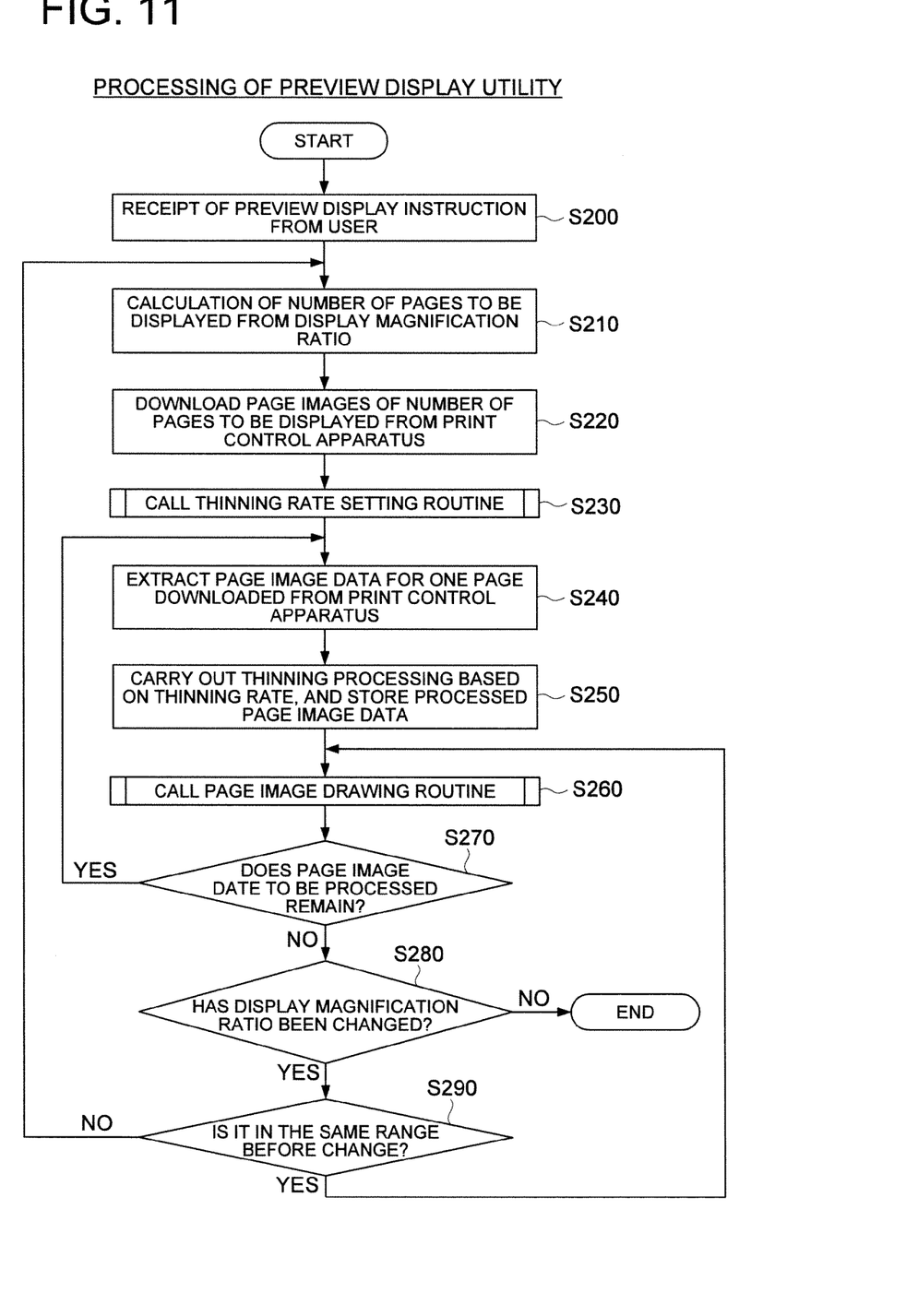
FIG. 11 is a flowchart illustrating processing of a computer apparatus (preview display utility) according to a preferred embodiment of the present invention.
Figure 12:
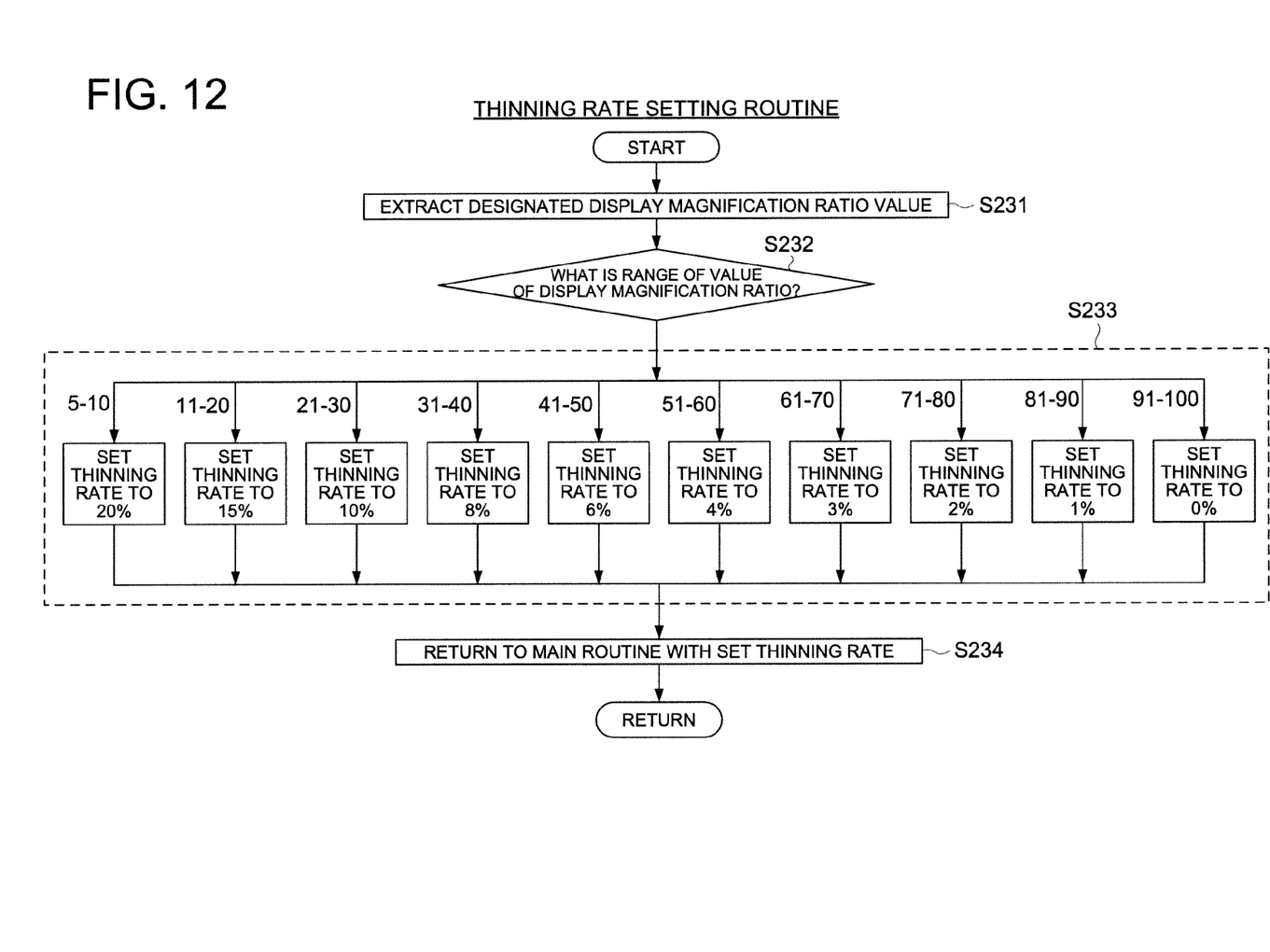
FIG. 12 is a flowchart illustrating processing of a print control apparatus according to a preferred embodiment of the present invention.
Figure 13:
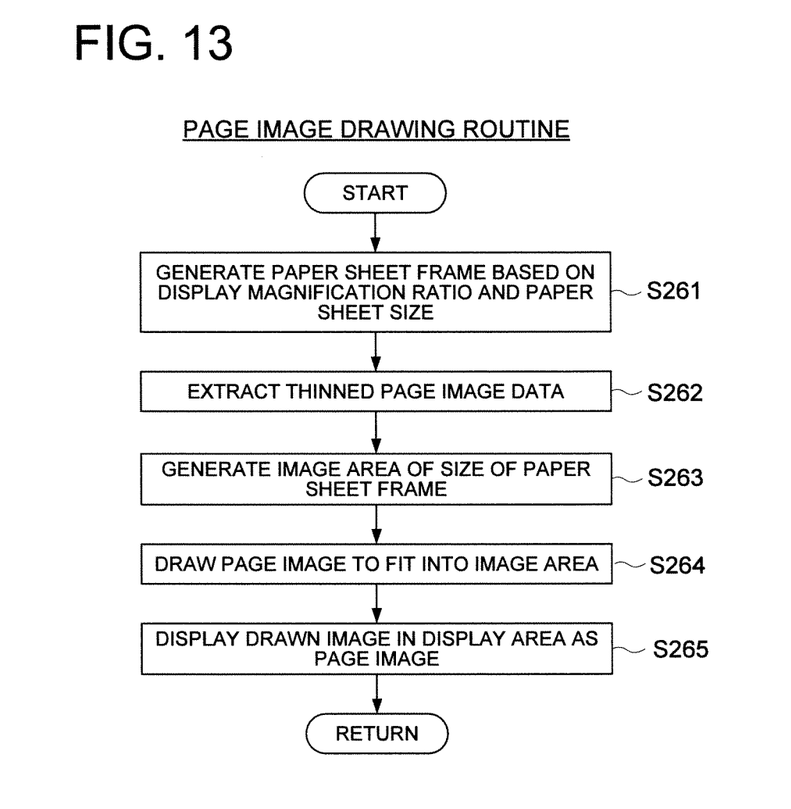
FIG. 13 is a flowchart illustrating details of a page image drawing routine.

In order to describe the above-described preferred embodiment in more detail, an image display apparatus, an image display system, and an image display control program according to an example of preferred embodiments of the present invention will be described in detail with reference to the accompanying drawings (FIGS. 1 to 13), without the present invention being limited to the embodiments. FIG. 1 is a conceptual diagram illustrating a printing system according to this preferred embodiment, FIG. 2 is a block diagram illustrating the configuration. FIG. 3 is a block diagram illustrating a configuration of a preview display utility which is executed by a computer apparatus, and FIG. 4 is a block diagram illustrating a configuration of a program which is executed by a print control apparatus. FIG. 5 is a block diagram illustrating a configuration of a screen which is displayed on a display section of a computer apparatus, and FIG. 6 is a diagram illustrating a relationship between display magnification ratio and thinning rate. FIG. 7 is a diagram illustrating a relationship between a paper sheet frame in each display magnification ratio and a display image. FIG. 8 is an explanatory diagram illustrating processing to draw a page image in a frame of a paper sheet, and FIG. 9 is an explanatory diagram illustrating processing to paste a page image in the entirety of a frame of a paper sheet FIG. 10 is a flowchart illustrating processing of a print control apparatus, and FIGS. 11 to 13 are each a flowchart illustrating processing of a preview display utility.

As illustrated in FIG. 1a, a printing system according to a preferred embodiment includes computer apparatus 10 of a client for instructing to print, print control apparatus 20 for generating a print image for each page by analyzing the print job, output apparatus 30 for executing printing according to the print image of each page, and the like. Computer apparatus 10 and print control apparatus 20 are connected to each other via a network such as a LAN (Local Area Network), a WAN (Wide Area Network), or the like, and print control apparatus 20 and output apparatus 30 are connected to each other via a dedicated interface.

It is to be noted that, although print control apparatus 20 and output apparatus 30 are separate apparatuses as illustrated in FIG. 1a, a preferred embodiment is not limited to the configuration, and a configuration can be applied in which these two apparatuses are incorporated into one apparatus, as an example, output apparatus 30 which is provided with functions of print control apparatus 20.

FIG. 2 illustrates a principal structure of each of the apparatuses of the printing system. Computer apparatus 10 is composed of CPU (Central Processing Unit) 11, ROM (Read Only Memory) 12, RAM (Random Access Memory) 13, NIC (Network Interface Card) 14, HDD (Hard Disk Drive) 15, display section 16, operation section 17, and the like.

Programs, such as a preview display utility that will be described later, stored in ROM 12 and HDD 15 is developed into RAM 13 and carried out by CPU 11. HDD 15 stores job information obtained from print control apparatus 20, page image data having been displayed, a table in which a range of a display magnification ratio of an image and a thinning rate are correlated with each other, and the like. NIC 14 performs communication processing such as an acquisition request for job information within print control apparatus 20 and a receipt of job information, or the like.

Display section 16 includes a liquid crystal display device, an organic EL (Electro Luminescence) display device, or the like, and display section 16 displays a screen, on which printing content is confirmed by displaying a page image of reduced data size of the print image of each page in a preview representation, a screen on which a user's selection, with respect to quality of page image in a preview representation, is received, and the like. Operation section 17 is composed of a pointing device, a key board, a trackball, a trackpad, a tablet, a stylus pen, and the like, and this configuration enables various operations such as a change of display magnification ratio of an image to be displayed, a selection with respect to page image quality, and the like.

Print control apparatus (controller) 20 is composed of CPU 21, ROM 22, RAM 23, NIC 24, HDD 25, and the like.

Programs stored in ROM 22 and HDD 25 are developed into RAM 23, and carried out via CPU 21. For example, print image data is generated by rasterizing each page in a print job of PDL (Page Description Language) as a printer language such as PCL (Printer Control Language) and PS (PostScript®). In ROM 22 and HDD 25, job information is stored in a database format. NIC 24 performs communication processing with computer apparatus 10, and performs communication processing such as transmission or reception of job information in accordance with a request from computer apparatus 10.

Output apparatus 30 is an image forming apparatus such as a network printer, a MFP (Multi-Function Peripheral), or the like.

It should be noted that FIG. 2 is an example of a printing system according to this preferred embodiment, and the configuration of each apparatus may be modifiable appropriately, for example, print control apparatus (controller) 20 is provided with a display section and an operation section.

FIG. 3 is a block diagram illustrating a program configuration of computer apparatus 10. The preview display utility is activated by computer apparatus 10, and downloads job information (property information, page image data and the like, of a job) from print control apparatus 20 via a network, and displays an image based on the page image data in computer apparatus 10. Specifically, the preview display utility controls computer apparatus 10 to function as, but is not limited to, job information downloading section 10a, thinning rate setting section 10b, thinning processing section 10c, paper sheet frame size changing section 10d, page image pasting section 10e, page image display section 10f, thinning processing selection designating section 10g, and priority processing selection designating section 10h.

Job information downloading section 10a is configured to download job information from print control apparatus 20 by requesting necessary job information from print control apparatus 20.

Thinning rate setting section 10b is configured to set a thinning rate in association with a display ratio, having been designated, by referring a table which has been stored in HDD 15, or the like, and configured to pass the thinning rate, having been set, to thinning processing section 10c.

Thinning processing section 10c is configured to perform thinning processing for a page image data in accordance with the thinning rate having been set. It is to be noted that the thinning processing is the general term for processing for reducing the size of bitmap data as previously described, and a heretofore known technology can be adopted.

Paper sheet frame size changing section 10d is configured to set the outline shape of a paper sheet, which is to be determined based on a display magnification ratio, as a paper sheet frame.

Page image pasting section 10e is configured to paste a page image based on page image data into the paper sheet frame. At that time, the page image is pasted in such a manner that the page image fits into the entirety of the paper sheet frame.

Page image display section 10f is configured to display the page image, having been pasted into the paper sheet frame, in display section 16 together with page information.

Thinning processing selection designating section 10g is configured in such a way that the user selects whether thinning processing is carried out via print control apparatus 20, or via computer apparatus 10 of the client. In the case in which a thinning processing is carried out via computer apparatus 10, page image data, having been generated from print image data, is transmitted to computer apparatus 10 as it is. On the other hand, in the case in which a thinning processing is carried out via print control apparatus 20, page image data, having been subjected to the thinning processing, is transmitted to computer apparatus 10, and therefore, data amount required for transmission can be reduced.

Priority processing selection designating section 10h is configured in such a way that the user selects whether image quality is prioritized or processing speed is prioritized in the display processing of page image. It is preferable that the user can select one or the other because image quality is deteriorated in case in which processing speed is prioritized, and processing speed is reduced in case in which image quality is prioritized.

FIG. 4 is a block diagram illustrating a program configuration of print control apparatus 20, and the print control program is configured to control print control apparatus 20 to function, but is not limited to, as job information transmitting section 20a, image quality selection receiving section 20b, page image data generating section 20c, and thinning processing section 20d.

Job information transmitting section 20a is configured to transmit job information, having been stored in print control apparatus 20, in accordance with a request from computer apparatus 10 of the client. In the job information, property information of the job, page image data of each page in the job, status information of output apparatus 30, and the like, are included.

Image quality selection receiving section 20b is an interface to receive user's selections (processing speed priority, image quality priority, and the like) with respect to the quality of a page image, from computer apparatus 10, operation panel of print control apparatus 20, or the like.

Page image data generating section 20c is configured to generate page image data, of which the data size has been reduced, from print image data having been generated from a print job. At that time, the attributes of the page image data to be generated can be changed in accordance with a parameter, such as processing speed priority, image quality priority, or the like.

Thinning processing section 20d is configured to execute thinning processing in a case in which thinning processing is to be carried out via print control apparatus 20. It is to be noted that, in a case in which thinning processing is carried out via print control apparatus 20, thinning processing section 20d obtains a thinning rate which has been set via thinning rate setting section 10b of computer apparatus 10, and performs thinning processing in accordance with the thinning rate, or thinning processing section 20d obtains from computer apparatus 10 the display magnification ratio, which has been designated via the screen of computer apparatus 10, and sets a thinning rate with reference to the table (table in which a range of a display magnification ratio and a thinning rate are correlated with each other), and performs thinning processing in accordance with the thinning rate having been set.

FIGS. 5a and 5b are each a block diagram illustrating an example of a screen (an image confirmation screen) which is displayed via display section 16 of computer apparatus 10, and a display area for displaying page images and a slider (refer to the dotted line in the figures) for setting a display magnification ratio of the page images are provided on the image confirmation screens. For example, 24 pages of images are displayed in the case of a display magnification ratio of 5% as shown in FIG. 5a. and only one page image is displayed in the case of display magnification ratio of 100% as shown in FIG. 5b.

In a commonly-used display method to display page images, because the data size of original image data of each page is the same, 24 times as much data needs to be processed in the case of display magnification ratio of 5% (namely, a total of 24 pages of images can be displayed in a preview representation), compared to the case of display magnification ratio of 100% (namely, a one page image can be displayed in a preview representation). Because the small details of a page image can barely be discerned in case of display magnification ratio of 5% even though the details can be discerned in case of display magnification ratio of 100%, there is no problem to reduce the definition of the page image (namely, to increase the thinning rate of the page image) if the display magnification ratio is small. Therefore, in the past, the amount of data to be processed is reduced by changing thinning rate minutely in accordance with the display magnification ratio.

However, if thinning rate is changed in each case in accordance with display magnification ratio, it becomes necessary to execute a thinning processing for original page image data with respect to the number of pages to be displayed in a preview representation, resulting in the problem that it takes longer to redisplay the page images. In other words, because it is necessary not only to carry out a thinning processing in accordance with a display magnification ratio with respect to page image data of a large data size, but also to carry out the thinning processing for the number of pages to be displayed in a preview representation, and therefore, resulting in the problem that it takes longer to redisplay the page images.

Therefore, in this preferred embodiment, instead of changing thinning rate minutely in accordance with a display magnification ratio, by setting a range of display magnification ratios so that thinning rate is not changed when a display magnification ratio is changed within the range, page images can be redisplayed promptly by utilizing the page image data having been generated to display at the display magnification ratio before the change (namely, the page image data of which the data amount has been reduced after a thinning processing) in cases in which display magnification ratio is changed within either one of the ranges.

FIG. 6 is a diagram illustrating a relationship between a display magnification ratio and a thinning rate. In this preferred embodiment, the thinning rate is set at 20% in the range of the display magnification ratios from 5% to 10%. Also, the thinning rate is set at 15% in the range of the display magnification ratios from 11% to 20%, and the thinning rate is set at 10% in the range of the display magnification ratios from 21% to 30%. The thinning rate is set in such a manner that the thinning rate is reduced as display magnification ratio increases, and the thinning rate is set at 0% in the range of the display magnification ratios from 91% to 100%. By storing a table, in which relationship between display magnification ratio and thinning rate is described, in HDD 15, the table can be utilized when thinning rate setting section 10b sets the thinning rate.

It should be noted that thinning rates in FIG. 6 are mere examples, and the numeric values may by changed appropriately in accordance with the size and/or resolution of page image data which are the base of the thinning processing. Also, the ranges of display magnification ratios, in FIG. 6, are mere examples, and the numeric values may by changed appropriately in accordance with the size and/or resolution of the screen of display section 16. Further, although the ranges of display magnification ratios do not overlap each other in FIG. 6, the ranges of display magnification ratios may be set such that the ranges do overlap each other.

As described above, by setting ranges of display magnification ratios and by correlating the ranges with corresponding thinning rates, the page image data, having been generated at the time when displayed at the display magnification ratio before the change, can be utilized because the thinning rate is not changed in cases in which the display magnification ratio is changed within either one of the ranges. However, because the size of paper sheet frame, which indicates the outline shape of paper sheet to be printed, is changed in cases in which the display magnification ratio is changed, the size of paper sheet frame does not match the size of page image in a case in which an image, based on the page image data which has been generated before the change of display magnification ratio, is utilized as it is. Therefore, in this preferred embodiment, an enlargement or a reduction of a page image is carried out in accordance with the size of paper sheet frame so that the page image, having been generated before the change of display magnification ratio, can be accurately fitted into the paper sheet frame corresponding to the display magnification ratio after the change. It should be noted that a concrete method of the enlargement or reduction may be or may not be the same as the method used in thinning processing.

FIG. 7 is a diagram illustrating a relationship between the sizes of paper sheet frames in accordance with display magnification ratios and the sizes of images to be pasted into the paper sheet frames. As shown in FIG. 7, it is set in such a manner that the paper sheet frame fits into display magnification ratio in units of 1%, and that the size of an image, which fits into the minimum size of paper sheet frame in each range of display magnification ratios, is assigned. For example, in the range of the display magnification ratio of 41% to 50%, the image, which fits into a paper sheet frame of 41%, is utilized. Therefore, although the image can be pasted as is into the paper sheet frame of 41% in case in which the display magnification ratio is 41%, the image is to be pasted, after being enlarged, so as to fit into a paper sheet frame of 50%.

Here, in cases in which an image is enlarged to fit into a paper sheet frame, thinning processing for page image data is further required, and therefore, as a result, thinning processing in accordance with display magnification ratio is carried out. However, this method can reduce the load of thinning processing when compared with the conventional method in which page image data of a final size is generated from original page image data.

It should be noted that, in this preferred embodiment, although an image is enlarged in cases in which the size of the image is set to a minimum size of a paper sheet frame within each range and the display magnification ratio is changed within the range, an image may be reduced in cases in which the size of the image is set to a maximum size of a paper sheet frame within each range and the display magnification ratio is changed within the range, or an image may be enlarged or reduced in cases in which the size of the image is set to an intermediate size of a paper sheet frame within each range and the display magnification ratio is changed within the range.

FIG. 8 is an explanatory diagram illustrating the process to draw a page image into a paper sheet frame. A page image is always drawn to fit into the paper sheet frame. In a case in which the size of a paper sheet frame is different from the size of the image, the image is enlarged so as to fit into the entirety of the paper sheet frame while maintaining the aspect ratio of the image. A paper sheet frame indicates the size of a paper sheet, and a print image of a required display magnification ratio can be displayed accurately in this way.

FIG. 9 is an explanatory diagram illustrating the process to paste a page image into paper sheet frames of different sizes, and illustrates the case of magnification ratios from 41% to 50% as illustrated in FIG. 7. Paper sheet frames of 41% and 50% are prepared, and an image of a size of 41% is used for both of the paper sheet frames. With respect to the paper sheet frame of 41%, an image of 41% can be drawn on a one-to-one basis. However, in a case in which an image of 41% is to be drawn to fit into a paper sheet frame of 50%, it is necessary to draw the image by enlarging the image by 22% (enlarging while maintaining the aspect ratio of the image). In other words, when an image of a display magnification ratio of 41% is considered as 100, an image of the display magnification ratio of 50% becomes 78, and therefore, the image is in a state of being thinned further.

Hereinafter, an operation of a printing system, according to the preferred embodiment, will be described in detail with reference to FIGS. 10 to 13.

[Processing of Print Control Apparatus]

FIG. 10 is a flowchart illustrating processing of a print control apparatus.

First, when a request for page image data from computer apparatus 10 of a client is received (step S100), page image data generating section 20c generates page image data from print image data which is rasterized designated page data in a designated print job (step S110). Here, in rasterizing a designated page, because printing resolution necessary for screen display (as an example, 170 dpi) is significantly lower than an actual printing resolution (as an example, 1200 dpi), it is only necessary to generate print image data at the lower resolution. It should be noted that a page image may be print image data itself generated after being rasterized, or may be processed rasterized data subjected to various image processings carried out on the print image data (or may be processed rasterized data having been generated by carrying out various image processings for the print image data). In general, because an RGB color space or a sRGB (standard RGB) color space is adopted for display, while print data, having been rasterized for printing, is developed into a CMYK color space, either CMYK-to-RGB conversion or CMYK-to-sRGB conversion is carried out. Or, in rasterizing, print image data may be rasterized and developed directly into an RGB color space.

Next, information designated by thinning processing selection designating section 10g of computer apparatus 10 is obtained from computer apparatus 10, and it is determined whether thinning processing is to be carried out in computer apparatus 10 or in print control apparatus 20 (step S120). In cases in which thinning processing is to be carried out in print control apparatus 20 (step S120: NO), it is determined whether generation processing of page image data is processing speed priority or image quality priority, based on information designated by image quality selection receiving section 20b (step S130). In the case of processing speed priority (step S130: YES), a thinning rate, which has been set via thinning rate setting section 10b of computer apparatus 10, is obtained from computer apparatus 10, and thinning processing for the page image data is carried out in accordance with the obtained thinning rate (step S140).

Next, job information transmitting section 20a transmits page image data generated in step S110, or page image data subjected to thinning processing in step S140, to computer apparatus 10 (step S150). At that time, job information transmitting section 20a also transmits property information of the job and status information of output apparatus 30 to computer apparatus 10. Then, it is determined whether data (print image data which is the base of page image data) to be processed still remains (step S160). In cases in which the data remains, the processings from step S110 to step S150 are repeated until there is no more data to be processed.

[Processing of Preview Display Utility]

FIG. 11 is a flowchart illustrating processing of preview display utility executed via computer apparatus 10.

When the preview display utility receives preview display instruction from the user (step S200), the preview display utility calculates the number of pages to be displayed from the display magnification ratio of a page image designated via the image confirmation screen illustrated in FIG. 5, and the size of the screen onto which the page images are displayed (step S210). Then, job information downloading section 10a downloads page image data of the number of pages to be displayed from print control apparatus 20 (step S220).

Next, a thinning rate setting routine is called (step S230). FIG. 12 is a flowchart illustrating processing of the thinning rate setting routine, and thinning rate setting section 10b extracts a designated display magnification ratio value (step 231), refers to tables stored in HDD 15 and the like, and sets the thinning rate in accordance with the range of the value of the display magnification ratio (steps S232 and S233). In this example, the thinning rate is 20% in the case of display magnification ratios from 5 to 10%, the thinning rate is 15% in the case of display magnification ratios from 11 to 20%, the thinning rate is 10% in the case of display magnification ratios from 21 to 30%, the thinning rate is 8% in the case of display magnification ratios from 31 to 40%, the thinning rate is 6% in the case of display magnification ratios from 41 to 50%, the thinning rate is 4% in the case of display magnification ratios from 51 to 60%, the thinning rate is 3% in the case of display magnification ratios from 61 to 70%, the thinning rate is 2% in the case of display magnification ratios from 71 to 80%, the thinning rate is 1% in the case of display magnification ratios from 81 to 90%, and the thinning rate is 0% in the case of display magnification ratios from 91 to 100%. Then, the flow returns from the thinning rate setting routine to the main routine in HG. 11 with the thinning rate, having been set (step S234).

Returning to FIG. 11, thinning processing section 10c extracts page image data for one page, having been downloaded from print control apparatus 20 (step S240), and carries out a thinning processing of page image data in accordance with the thinning rate, having been set, and stores the page image data, after having been subjected to the thinning processing, into HDD 15, or the like (step S250).

Next, a page image drawing routine is called (step S260). FIG. 13 is a flowchart illustrating details of the page image drawing routine. Paper sheet frame size changing section 10d generates a paper sheet frame in accordance with the display magnification ratio, having been designated on the screen, and the paper sheet size, having been designated by job information (step S261). Next, page image pasting section 10e extracts the page image data, after having been subjected to thinning processing (step S262). Then, page image pasting section 10e generates an image area of the size of the paper sheet frame (step S263), and draws the image based on the page image data, having been extracted, so that the image fits into the image area (step S264). After that, page image display section 10f displays the image, having been drawn in the image area, in the display area on the image confirmation screen (step S265).

Returning to FIG. 11, it is determined whether or not page image data to be processed still remains (step S270). In cases in which page image data remains, the flow returns to step S240 which is processing to extract page image for one page, and the processings from step S240 to step S260 are repeated until there is no more page image data to be processed.

When there is no more page image data to be processed, it is determined whether or not display magnification ratio has been changed via operation of the slider on the image confirmation screen (step S280). In cases in which display magnification ratio has not been changed, the processing of preview display utility is terminated, and in cases in which display magnification ratio has been changed, it is determined whether or not the display magnification ratio after the change is in the same range of the display magnification ratio before the change (step S290). In cases in which the display magnification ratio after the change is not in the same range of the display magnification ratio before the change, the number of pages to be displayed is calculated by returning to step S210 because thinning rate is to be changed, and after that, the same procedures are repeated.

On the other hand, in cases in which the display magnification ratio after the change is in the same range of the display magnification ratio before the change, it is not necessary to newly carry out the thinning processing because the thinning rate has not been changed, and the page drawing routine is called at step S260. In the page drawing routine, paper sheet frame size changing section 10d generates a paper sheet frame (step S261) based on the display magnification ratio after the change and the paper sheet size designated by job information, and page image pasting section 10e extracts page image data, having been subjected to the thinning processing with respect to the display magnification ratio before the change, from HDD 15 or the like (step S262), generates an image area for the size of the paper sheet frame (step S263), and draws the image based on the page image data, having been extracted, so that the image fits into the image area (step S264). After that, page image display section 10f redisplays the image, having been drawn in the image area, in the display area in the image confirmation screen (step S265).

In this way, by setting ranges of display magnification ratios so as to set a thinning rate for each of the ranges, and by drawing a page image so that the page image fits into a paper sheet frame, page image data, having been generated by carrying out a thinning processing at the time of the previous display, can be utilized in cases in which, after displaying a page image at a display magnification ratio, the display magnification ratio has been changed within the same range, and therefore, the amount of data to be handled can be reduced and a page image can be redisplayed promptly.

Although the preferred embodiment of the present invention have been fully described by way of examples with reference to the accompanying drawings, it should be noted that various changes and modifications will be apparent to those skilled in the art. Therefore, unless such changes and modifications depart from the scope of the present invention, they are to be construed as being included therein.

For example, although an example of a case, in which a page image of a print image of each page based on a print job is displayed in a preview representation, has been described in the above described preferred embodiment, this invention is not limited to the aforesaid preferred embodiment, and can be applied equally to a case in which a plurality of images, of which the sizes are large and approximately constant, are displayed in a preview representation.

What is claimed is:

1. An image display apparatus which displays one or a plurality of images, which is based on an image data subjected to be processed by a job, at a designated display magnification ratio, said image display apparatus comprising:
    a storage section for storing a plurality of magnification ratio ranges and a plurality of predetermined thinning rates, each one of said magnification ratio ranges is associated with a respective one of said predetermined thinning rates;
    a job information downloading section for obtaining an image data pertinent to said image from an apparatus that stores an information about said job;
    a thinning rate setting section for setting, with reference to said storage section, a thinning rate to a particular one of said predetermined thinning rates based on a first designated display magnification ratio that falls within said magnification ratio range associated with said particular thinning rate;
    a thinning processing section for carrying out a thinning processing with respect to said image data in accordance with said thinning rate having been set by said thinning rate setting section based on said first designated display magnification ratio, and for storing said image data, which has been subjected to said thinning processing, in said storage section;
    an image pasting section for pasting an image, which is based on said image data which has been subjected to said thinning processing, into a first frame having a size in accordance with said first designated display magnification ratio; and
    an image display section for displaying said image which has been pasted into said first frame by said image pasting section,
    wherein when said first designated display magnification ratio is changed to a second designated display magnification ratio different from said first designated display magnification ratio while said first and second designated display magnification ratios are both within any one of the plurality of magnification ratio ranges stored in the storage section, said image pasting section is configured to: a) utilize said image data that has been subjected to said thinning processing in accordance with said thinning rate set by said thinning rate setting section based on said first designated display magnification ratio; and b) paste said image, which is based on said image data, by magnifying said image so as to fit into a second frame having a size in accordance with said second designated display magnification ratio.

2. The image display apparatus described in claim 1, wherein said job is a print job to control an image forming apparatus to execute printing, said image data is a print image data of each page, and said first and second frames are frames which indicate an outline shape of a paper sheet having been designated via said job.

3. An image display system comprises a first apparatus that stores an information of a job, and a second apparatus that displays one or a plurality of images, which is based on an image data subjected to be processed by said job, at a designated display magnification ratio,
    wherein said first apparatus comprises:
        an image data generating section for generating an image data pertinent to one or a plurality of images which is based on an image data subjected to be processed by said job;
        a thinning processing section for carrying out a thinning processing with respect to said image data, in accordance with a thinning rate having been set via said second apparatus based on a first designated display magnification ratio; and
        a job information transmission section for transmitting said image data, which has been subjected to the thinning processing, to said second apparatus,
    wherein said second apparatus comprises:
        a storage section for storing a plurality of magnification ratio ranges and a plurality of predetermined thinning rates, each one of said magnification ratio ranges is associated with a respective one of said predetermined thinning rates;
        a thinning rate setting section for setting, with reference to said storage section, a thinning rate to a particular one of said predetermined thinning rates based on said first designated display magnification ratio that falls within said magnification ratio range associated with said particular thinning rate;
        a job information obtaining section for obtaining said image data, which has been subjected to said thinning processing, from said first apparatus;
        an image pasting section for pasting an image, which is based on said image data which has been subjected to said thinning processing by said thinning processing section of said first apparatus, into a first frame having a size in accordance with said first designated display magnification ratio; and
        an image display section for displaying said image which has been pasted into said first frame by said image pasting section,
    wherein when said first designated display magnification ratio is changed to a second designated display magnification ratio different from said first designated display magnification ratio while said first and second designated display magnification ratios are both within any one of the plurality of magnification ratio ranges stored in the storage section, said image pasting section in said second apparatus is configured to: a) utilize said image data that has been subjected to said thinning processing by said thinning processing section of said first apparatus in accordance with said thinning rate set by said thinning rate setting section based on said first designated display magnification ratio; and b) paste said image, which is based on said image data, by magnifying said image so as to fit into a second frame having a size in accordance with said second designated display magnification ratio.

4. The image display system described in claim 3, wherein said job is a print job to control an image forming apparatus to execute printing, said image data is a print image data of each page, and said first and second frames are frames which indicate an outline shape of a paper sheet having been designated via said job.

5. A non-transitory computer-readable recording medium recorded therein a program that causes a computer to enable functions of an image display apparatus which displays one or a plurality of image which is based on an image data subjected to be processed by a job at a designated display magnification ratio, the functions comprising:

a storage section for storing a plurality of magnification ratio ranges and a plurality of predetermined thinning rates, each one of said magnification ratio ranges is associated with a respective one of said predetermined thinning rates;

a job information downloading section for obtaining an image data pertinent to said image from an apparatus that stores an information about said job;

a thinning rate setting section for setting, with reference to said storage section, a thinning rate to a particular one of said predetermined thinning rates based on a first designated display magnification ratio that falls within said magnification ratio range associated with said particular thinning rate;

a thinning processing section for carrying out a thinning processing with respect to said image data in accordance with said thinning rate having been set by said thinning rate setting section based on said first designated display magnification ratio, and for storing said image data, which has been subjected to said thinning processing, in said storage section;

an image pasting section for pasting an image, which is based on said image data which has been subjected to said thinning processing, into a first frame having a size in accordance with said first designated display magnification ratio; and an image display section for displaying said image which has been pasted into said first frame by said image pasting section, wherein when said first designated display magnification ratio is changed to a second designated display magnification ratio different from said first designated display magnification ratio while said first and second designated display magnification ratios are both within any one of the plurality of magnification ratio ranges stored in the storage section, said image pasting section is configured to: a) utilize said image data that has been subjected to said thinning processing in accordance with said thinning rate set by said thinning rate setting section based on said first designated display magnification ratio; and b) paste said image, which is based on said image data, by magnifying said image so as to fit into a second frame having a size in accordance with said second designated display magnification ratio.

6. The non-transitory computer-readable recording medium described in claim 5, wherein said job is a print job to control an image forming apparatus to execute printing, said image data to be processed by said job is a print image data of each page, and said first and second frames are frames which indicate an outline shape of a paper sheet having been designated via said job.

* * * * *